United States Patent [19]
Karmann et al.

[11] 3,802,239
[45] Apr. 9, 1974

[54] MACHINE AND METHOD FOR FORMING TAPERED TUBES

[75] Inventors: Thomas R. Karmann, Omaha; Alton T. Adams, Arlington, both of Nebr.

[73] Assignee: Valmont Industries, Inc., Valley, Nebr.

[22] Filed: June 8, 1972

[21] Appl. No.: 261,554

[52] U.S. Cl.......................... 72/51, 72/368, 72/370
[51] Int. Cl............................................. B21d 39/02
[58] Field of Search........ 72/51, 368, 370; 113/7 A, 113/8; 29/477, 477.7

[56] References Cited
UNITED STATES PATENTS
| | | | |
|---|---|---|---|
| 2,277,519 | 3/1942 | Laxo | 113/8 |
| 1,899,143 | 2/1933 | Frahm | 29/477 |
| 665,088 | 1/1901 | Gould | 72/51 |

*Primary Examiner*—Charles W. Lanham
*Assistant Examiner*—Robert M. Rogers
*Attorney, Agent, or Firm*—Henderson & Strom

[57] ABSTRACT

The invention comprises a machine and a method for forming an elongated tapered tube for use as light poles and the like, the machine comprising means for supporting a flat, trapezoidal sheet of metal in a horizontal position, an elongated mandrel having the shape of the tube to be formed held down along the longitudinal axis of the sheet, a pair of forming elements mounted along each side and below the sheet with power means for raising the formers upwardly and moving them inwardly toward each other whereby to form the sheet about the mandrel, means for flattening the edges of the sheet such that they are contiguous for welding purposes, and means for removing the formed tube from the machine as another sheet is brought into the machine and placed on the supporting means.

8 Claims, 15 Drawing Figures

PATENTED APR 9 1974

MACHINE AND METHOD FOR FORMING TAPERED TUBES

BACKGROUND OF THE INVENTION

The formation of a thin sheet of metal into an elongated tube having a tapering or ever-changing diameter, and with the longitudinal edges of the sheet placed in a contiguous or juxtaposed condition has always caused many problems due to the inherent nature of the problem.

The guage of the material, the type of material, the length of the desired tube, the shape of the sheet and of the desired tube, all of these factors have to be taken into consideration in the equipment which forms the tapered tube, in a mass producing manner.

Applicant has built and tested several prototypes. In one embodiment, a trapozoidal sheet was placed over a semi-circular cavity having a shape of the desired tapered tube, and with a like cavity placed above. Means were provided for forcing a mandrel downward onto the sheet, thus forcing the sheet into the lower cavity to assume that shape. Laterally movable forming elements were used to bend in the free upper edges, and the upper mold was used to finish the process.

In another instance, a lower mold arrangement was used to force the partially formed sheet against an upper cavity for forming purposes, wherein the lower mold comprised a great plurality of vertically disposed, relatively movable plates the upper surfaces of which were formed to assume in assembled form the desired shape of the tube. None of these arrangements with their numerous ramifications proved satisfactory.

SUMMARY OF THE INVENTION

This invention relates to the formation from a blank, trapezoid sheet of metal having the original outer edges placed in a contiguous position the entire length of the trapezoid sheet, the machine comprising means for horizontally supporting the sheet, an elongated mandrel having the shape of the tube to be formed placed and held over and along the longitudinal axis of the sheet, means for progressively forming the sheet about the surface of the mandrel, means for flattening the outer edges of the sheet against the mandrel, and means for removing the finished open tube from the machine.

The invention comprises further the process of forming the tapered tube including the steps of forming a thin metallic sheet into a trapezoid, holding a tapered mandrel on top of and along the longitudinal axis of the sheet, engaging the sheet below it and the mandrel along the outer edge portions and forcing the sheet's outer portions upwardly and then inwardly toward each other until the sheet is formed partially about the mandrel, then compressing the free edges to a flattened condition on the mandrel wherein they are juxtaposed, and subsequently separating and removing the formed open tube from the mandrel.

It is an object to provide a new and novel tapered tube forming machine.

It is another object to provide such a machine wherein a thin sheet of metal is formed into an open tapered tube the free edges of which are formed into a juxtaposed condition ready for welding.

Yet another object of this invention is to provide such a machine wherein the open tapered tube formed by the machine needs only to have the free edges welded prior to burnishing for a completed tube.

It is still another object of this machine to provide means for simultaneously wrapping the side portions of the sheet about a mandrel such that an even pressure is applied to the sheet during wrapping to prevent undue stress and strain on the sheet during the forming.

Another object of the invention is to provide a new and novel process for forming a tapered tube from a thin trapezoidal sheet of metal.

Still another object of this invention is to provide a machine and a method of accomplishing the above designated objectives which is economical, effective and efficient.

These objects and other features and advantages will be readily apparent upon reference to the following description when taken in conjunction with the accompanying drawings.

DESCRIPTION OF THE PREFERRED EMBODIMENT

Figure 1:
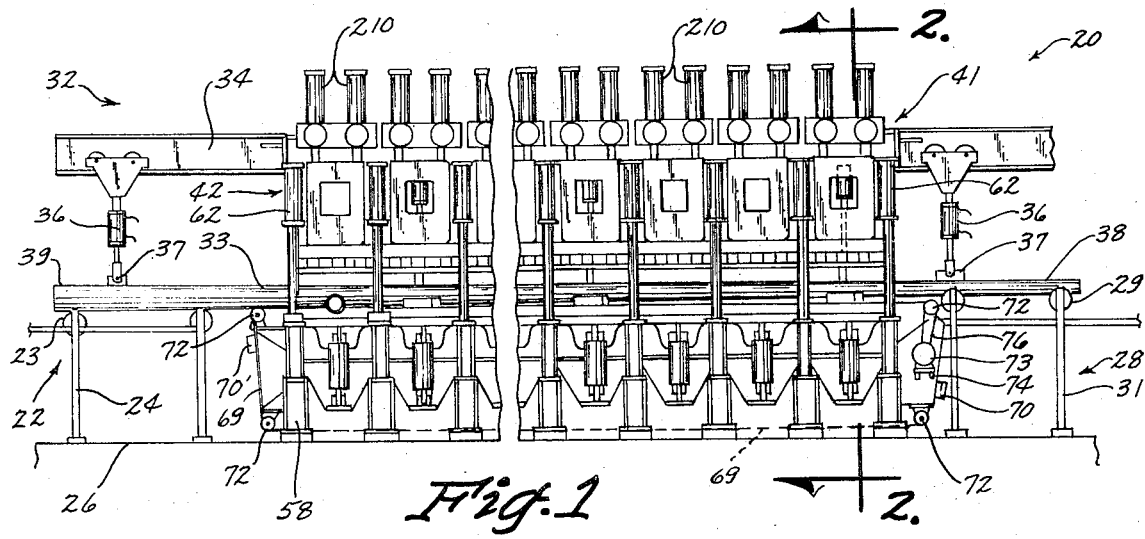
FIG. 1 is a fragmentary, side elevational view of the machine of this invention.
Figure 3:
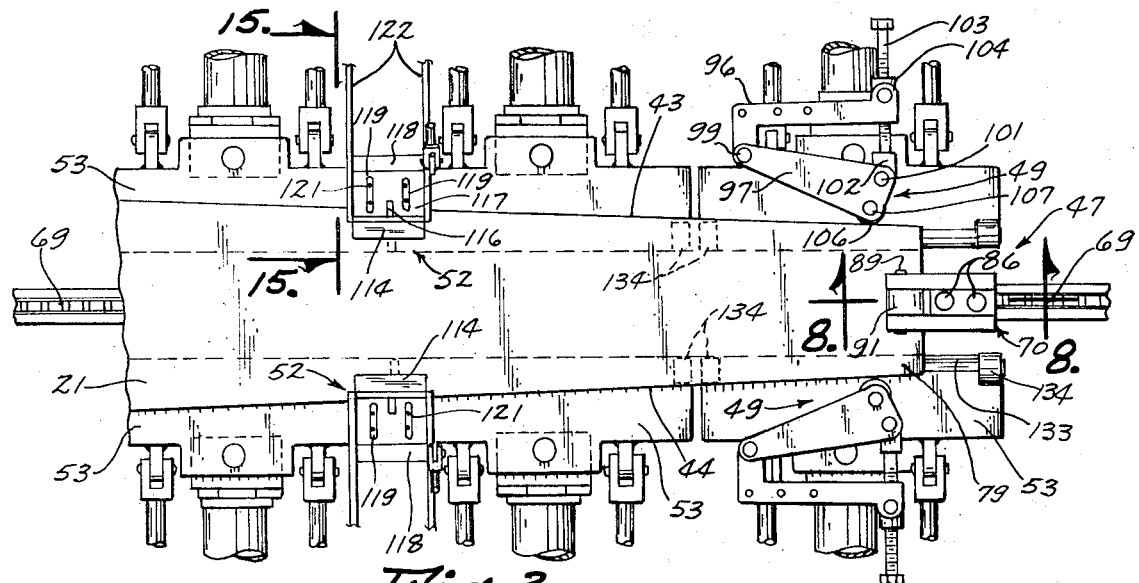
FIG. 3 is a fragmentary plan view taken along the lines 3—3 in FIG. 2, and with the mandrel of FIG. 2 eliminated for purposes of illustration.

Referring to the drawings and particularly FIG. 1, a preferred embodiment of the machine of this invention is illustrated generally at 20 in FIG. 1, and is effective to receive a thin trapezoidal sheet 21, a portion of which is shown in FIG. 3, from an entry conveyor unit 22 comprised of a plurality of rollers 23 mounted on interconnected supports 24, the machine 20 and the unit 22 being supported on a floor 26.

Figures 5, 6:
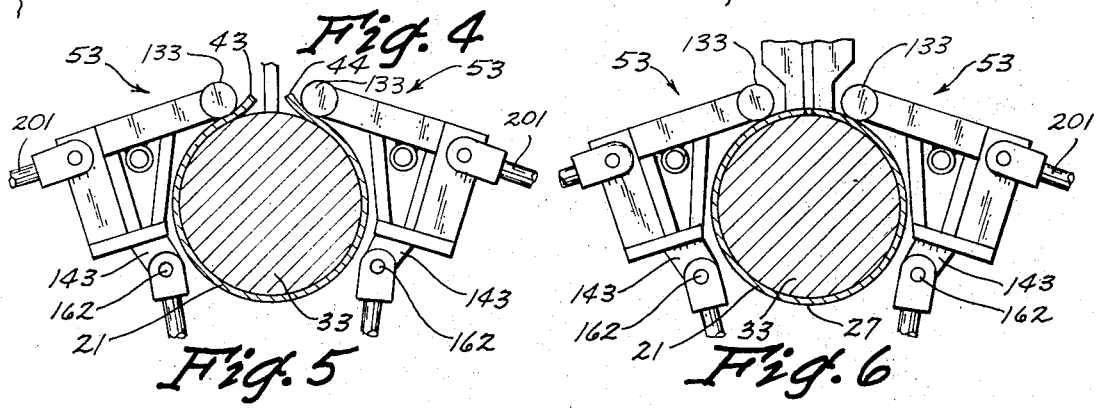
FIGS. 5 and 6 are enlarged detail views taken from FIG. 4, and showing additional movements of operating elements of the machine used in the formation of the open tapered tube.

The machine 20 is operable to form the flat sheet 21 into an open tapered tube 27, shown in cross section in FIG. 6, discharging the tube 27 onto a discharge conveyor unit 28 (FIG. 1) comprised of a plurality of rollers 29 and interconnected supports 31 therefor also mounted on the floor 26. An overhead conveyor unit 32 is provided for moving an elongated, tapered mandrel 33 longitudinally back and forth in the machine 20. The conveyor unit 32 comprises a horizontally disposed I-beam 34 on which are mounted a pair of horizontally spaced hydraulic cylinder lift units 36 connected by flanges 37 to the front and rear ends 38 and 39, respectively, of the mandrel 33 at the front and rear ends 41 and 42, respectively of the machine 20.

Figure 14:
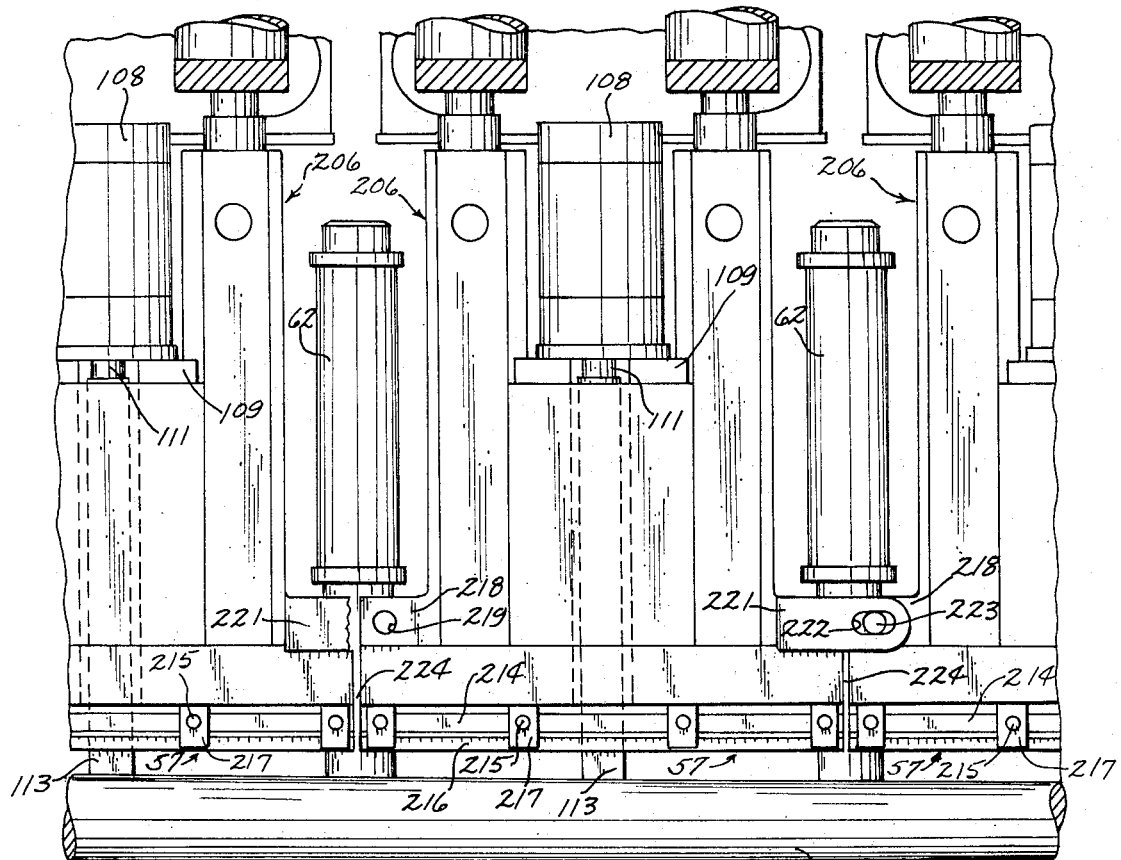
FIG. 14 is an enlarged elevational view taken along the line 14—14 in FIG. 2.

The mandrel 33 is solid, has a length of at least 50 feet, and has a tapering cross section of a progressively reducing diameter from the rear end 39 thereof to the front end 38; the shape of the mandrel being of the exact shape of the tube 27 to be formed within the machine 20 along any predetermined length of the mandrel. The sheet 21 of material to be formed is of either carbon steel, stainless steel or of aluminum. The carbon steel is from 3 through 11 gauge, with the stainless steel being from 3 through 14 gauge, and the aluminum sheets being of 10 gauge. The length of the tubes 27 (FIG. 6) formed by this machine 20 vary from approximately 12 feet to 50 feet. The tube 27 is formed for further processing by a welding apparatus, wherein the longitudinal free edges 43 and 44 (FIG. 6) of the tube 27 are welded together for completely enclosing the tube 27. The welding apparatus being of a nature described in U.S. Pat. No. 3,329,329 issued July 4, 1967, an improvement of which is shown in our accompanying application entitled APPARATUS FOR AND WELDING OF TAPERED PIPE filed Mar. 20, 1972, Ser. No. 236,007. The machine 20 comprises generally a frame assembly 46 for supporting the machine on the floor 26, a sheet moving assembly 47 (FIGS. 2, 3 and 8), a sheet supporting assembly 48 (FIG. 2), a plurality of sheet locating devices 49 (FIG. 3), a mandrel hold down assembly 51 (FIGS. 2 and 14), a plurality of mandrel locating devices 52 (FIGS. 3 and 15), a plurality of former elements 53 (FIGS. 2 and 3), a plurality of former lift units 54 (FIGS. 2, 4 and 9), a plurality of former push units 56 (FIGS. 2, 4, 10–13), and a plurality of sheet edge flattening units 57 (FIGS. 2 and 14).

More particularly, the frame assembly 46 comprises generally and understandably without going into detail, a plurality of horizontally spaced pairs of base legs 58 longitudinally disposed the length of the machine 20, transverse frame members 59 interconnecting and supported on the base legs 58, with each frame member 59 being connected to a plurality of center support members 61, with laterally spaced, longitudinally disposed pairs of side stanchions 62 supporting a plurality of upper support units 63 mounted thereon, with each unit 63 connected to a vertical support 64 mounting a pair of vertically spaced roller units 66 and 67 the purpose of which is described hereinafter, and with the vertical supports 64 being interconnected with and supporting horizontal connectors 68. Other elements of the frame assembly 46 are either not illustrated or enumerated; however, it will be understood that sufficient vertical and lateral support for the operating elements of the machine 20 is provided.

Figure 2:
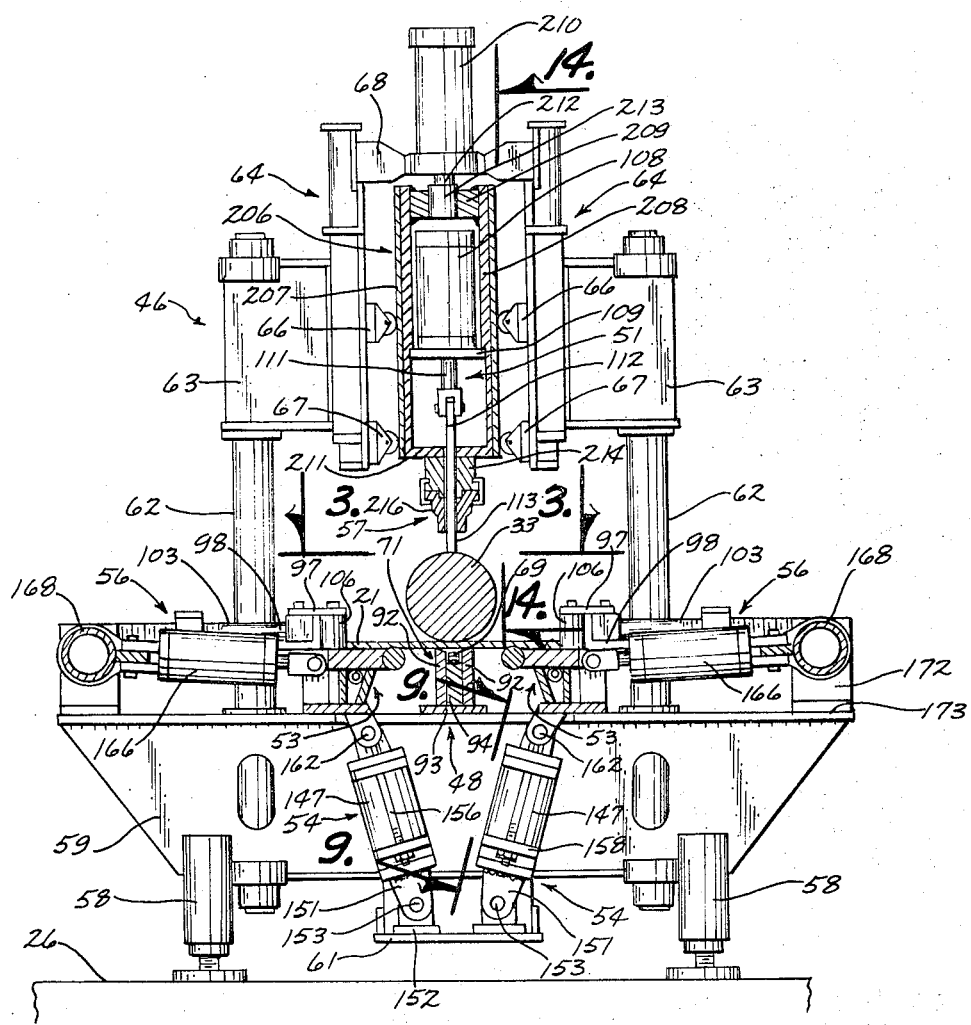
FIG. 2 is an enlarged vertical sectional of the machine taken along the line 2—2 in FIG. 1.

The sheet moving assembly 47 (FIG. 3) comprises an endless chain 69 (FIGS. 1, 2 and 8) to which is attached a clamp unit 70 (FIG. 8), and which chain 69 is moved across the machine 20 on a guide unit 71 (FIG. 2). A plurality of sprockets 72 (FIG. 1) are mounted at the front and rear of the machine for guiding the chain 69 thereabout, the chain being driven by a drive motor 73 (FIG. 1), mounted on a block 74 and including a drive belt 76 for rotating a drive shaft (not shown) for one of the sprockets 72.

Figure 8:
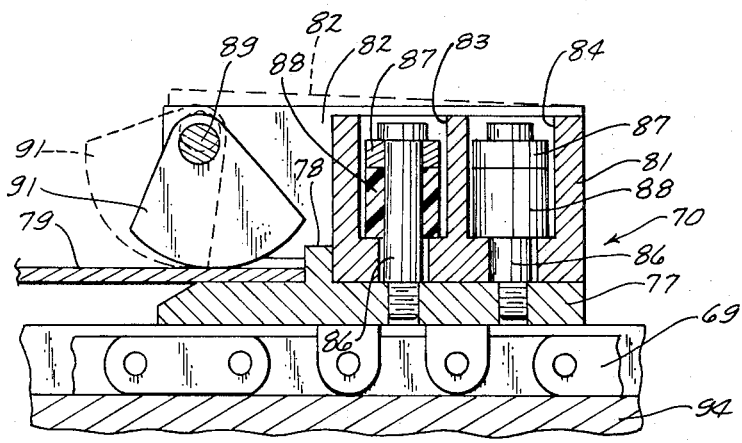
FIG. 8 is an enlarged vertical cross sectional view taken along the line 3—3 in FIG. 3, with certain parts shown in different positions by means of full and dotted lines.
Figure 9:
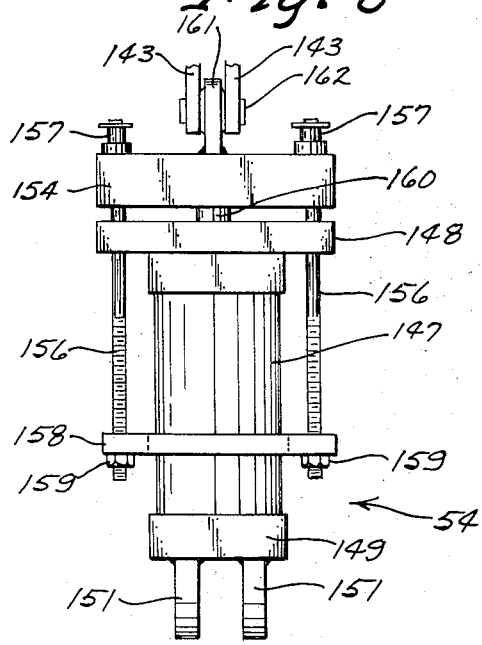
FIG. 9 is an enlarged view taken along the lines 9—9 in FIG. 2.

Referring to FIG. 8, the clamp unit 70 includes a base 77 having a shoulder 78 against which the front end 79 of the sheet 21 to be formed abuts; the clamp unit 70 including further a housing 81 having a pair of sidewalls 82 in which a pair of cavities 83 and 84 are formed. Within each cavity, a cap screw 86 holds down a metal washer 87 on top of a resilient spool 88. A transverse pivot 89 is secured between the sidewalls 82 for movably holding a cam 91.

As the sheet 21 is moved by the entry conveyor unit 22 (FIG. 1) into the rear end of the machine 20, the sheet front end 79 (FIG. 8) abuts against the shoulder 78 of the clamp unit 70, whereby the cam 91, being of an eccentric formation, holds the front end 79 of the sheet 21 as the chain 69 pulls the sheet forwardly and into the machine 20 until properly located (See FIG. 3). Sheet locaters, described hereinafter, prevent continued movement of the sheet 21 such that continued movement of the chain 69 results in the clamp unit housing 81 being raised slightly (See dotted lines in FIG. 8) by virtue of the resilient spools 88, whereby the clamp unit 70 releases the sheet 21 and moves on with the chain 69 until the chain is stopped.

The guide unit 71 also serves as a support for the sheet 21 (FIG. 2) in that the guide unit 71 comprises a pair of vertically disposed, laterally spaced support plates 92 extended along the longitudinal axis of the machine 20, and over which the longitudinal axis of the sheet 21 is placed for support. The plates 92 are secured on a mounting plate 93 the entire length of the machine 20.

Figures 4, 7:
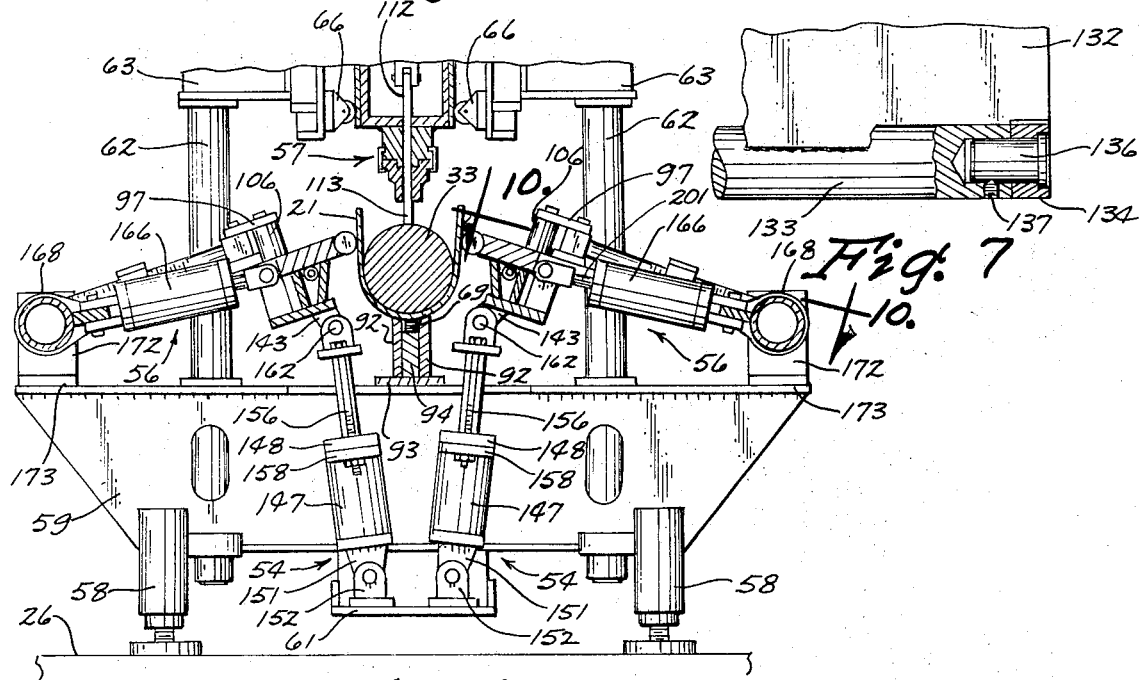
FIG. 4 is a vertical view similar to FIG. 2, and showing movement of certain operating units of the invention.
FIG. 7 is an enlarged, fragmentary view of a portion of a forming element, with parts thereof broken away for illustration purposes.

As each sheet locating device 49 (FIG. 3) is identical, only one will be described, with like elements being indicated by like parts. It will be understood, referring to FIG. 3, that pairs of locaters 49 are placed on opposite sides of the machine in longitudinally spaced pairs, the locaters 49 being spaced apart an appropriate distance to accommodate the trapezoidal shape of the sheet 21 such that as the sheet is pulled into the machine, the locaters 49 stop and simultaneously locate the sheet 21 such that its longitudinal axis is over the longitudinal axis of the machine and the support plates 92 (FIGS. 2 and 4).

A sheet locating device 49 comprises a bracket 96 (FIG. 3) which is secured to the frame of the machine, and to which a pair of upper and lower arms 97 and 98 are pivotally connected at one end by an inner pivot 99. At the outer ends of the arms 97 and 98 an outer pivot 101 (FIG. 3) is secured through a block 102 mounted between the arms 97 and 98. A horizontally disposed adjusting rod 103 (FIG. 3) is threaded through the block 102. By means of the adjusting rod 103, a roller 106 (FIG. 2) rotatably mounted within the arms 97 and 98 by a vertically disposed pin 107 is adjustably located laterally of the machine.

For the purpose of holding down the mandrel 33 (FIG. 2) when it has been placed along the longitudinal axis of the sheet 21 to be formed, a plurality of longitudinally spaced upright hydraulic cylinder units 108 (FIGS. 2 and 14) are supported along the longitudinal center of the machine 20 by means of mountings 109, and with the depending piston rods 111 being pivotally connected to the upper end of an elongated finger 112 the lower exposed end of which is free to engage the mandrel 33. By operation of the cylinder unit 108, pressure is put on the finger 112 whereby regardless of the tapering nature of the mandrel 33, fingers 112 engage the upper surface of same along its entire length within the machine 20 so as to hold the mandrel down against the sheet 21 and the sheet supporting assembly 48 for purposes described hereinafter.

To locate and retain the mandrel 33 in its position resting and held on the longitudinal axis of the sheet 21, a plurality of mandrel locating devices 52 (FIGS. 3 and 15) are provided on opposite sides of the mandrel and spaced longitudinally of the machine 20. As each device 52 is identical, only one will be described with like parts indicated by like reference numerals.

A mandrel locating device 52 includes a bracket 114 having an upright portion adapted to engage a side of the mandrel 33, and supported by a gusset 116 secured as by welding to a flat base 117 (FIG. 3). The base is mounted on a plate 118 and is adjustably secured thereto by the provision of a pair of slots 119 through which cap screws 121 are secured such that the bracket 114 and base 117 is movable as a unit laterally of the machine 20 and upon the plate 118.

Figure 15:
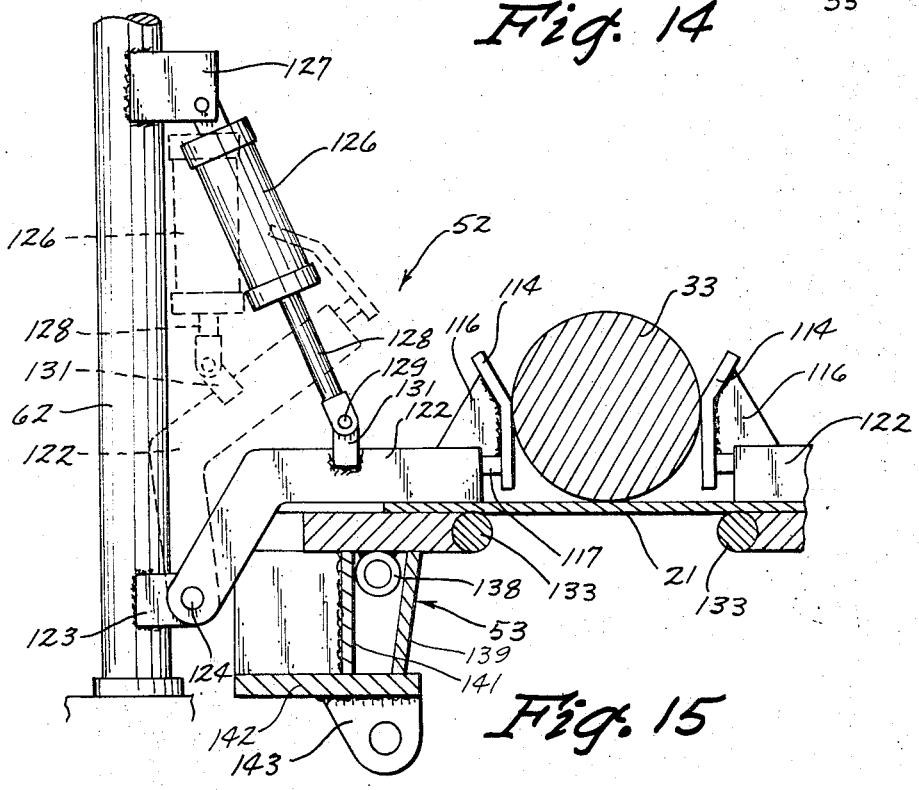
FIG. 15 is an enlarged vertical sectional view taken along the line 15—15 in FIG. 3.

A pair of arms 122 (FIGS. 3 and 15) extend rearwardly from securement to the plate 118 and are connected by pivot pins 124 to a pair of brackets 123 at the base of a stanchion 62 (FIG. 15). At an upper portion of the stanchion 62, a hydraulic cylinder 126 is pivotally connected at its upper end to a bracket 127 affixed to the stanchion 62, and with a depending piston rod 128 connected by a pivot pin 129 to a bracket 131 affixed to one of the arms 122. By this arrangement, the bracket 114 is movable from a dotted line position of FIG. 15, up and away from the mandrel 33 during formation of the sheet 21, to a position downwardly and against the mandrel 33 as shown by full lines in FIG. 15, while the sheet 21 is held flat prior to formation.

Figure 10:
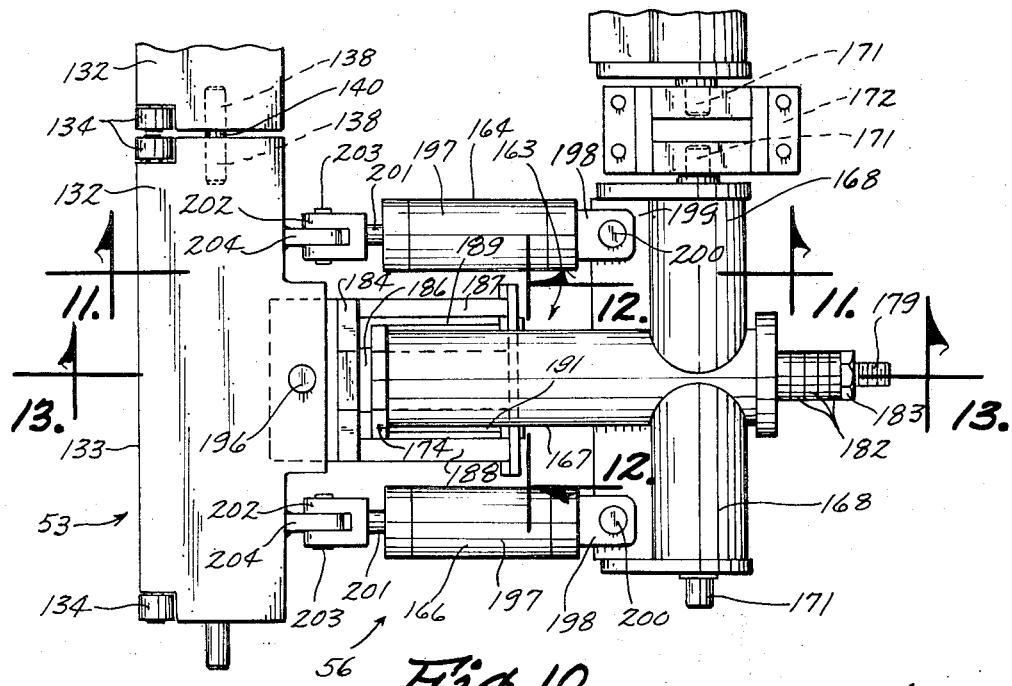
FIG. 10 is an enlarged horizontal view in plan, taken along the line 10—10 in FIG. 4.

As mentioned hereinbefore, a plurality of former elements 53 (FIG. 3) are provided on opposite sides of the sheet supporting assembly 48, the formers 53 being longitudinally aligned in a side-by-side condition. As each former 53 is identical, only one will be described with like parts indicated by like reference numerals. Referring particularly to FIGS. 3, 7 and 10, a former 53 includes a relatively flat, T-shaped plate 132 having a bar 133 (FIG. 7) disposed along the front edge thereof. At each end of the bar 133 a pair of rollers 134 are rotatably mounted for rotation about a horizontal axis disposed parallel to the longitudinal axis of the machine 20. The rollers are mounted each by a pin 136 (FIG. 7) secured by a screw 137 to the end of the bar 133.

On the bottom of the former plate 132 is mounted a journal 138 (FIG. 11) such that a pair of adjacent former plates 132 can be interconnected by a connecting pin 140 (FIG. 10). A pair of braces 139 and 141 are secured to the bottom side of the plate 132 and are connected to a base 142 (FIG. 11) from which a flange 143 (FIG. 13) depends. A pair of aligned holes 144 and 146 are formed in the plate 132 and the base 142 for a purpose described hereinafter.

For the purpose of lifting and moving the former plates 132 upwardly so as to initially wrap the sheet 21 about the sides of the mandrel 33, a former lift unit 54 (FIGS. 2 and 9) is provided for each former 53. As each lift unit 54 is identical to the other lift units, only one will be described. A lift unit 54 comprises a hydraulic cylinder 147 (FIG. 9) having a top plate 148 and a base 149 from which a pair of ears 151 depend for connection with a pivot block 152 (FIG. 2) where a pivotal connection by a pin 153 is made with the block 152. The block is mounted on the center support member 61.

A head 154 is provided for the cylinder 147 which is connected to a pair of elongated rods 156 by means of fasteners 157, with the rods being connected to a bottom plate 158 by fasteners 159. The bottom plate 158 embraces the cylinder 147 and is movable relative thereto with the head 154, the head being movable by the piston 160 of the cylinder 147. A pivot connector 161 is connected by a pin 162 to the flanges 143 on the base 142 of the former plate 132.

A push unit 56 (FIG. 10) is provided for each former 53, and as the push units 56 ar identical only one will be described with like reference numerals indicating like parts. The former push unit 56 is comprised of a T-shaped connector device 163 (FIG. 10) and a pair of hydraulic cylinder units 164 and 166 pivotally connected between a former plate 132 and the connector device 163 for moving the former plate 132 toward the mandrel 33 and away therefrom by pivoting the plate 132 about the pin 162 (FIG. 4) connecting the former 53 with the upper end of the lift cylinder 147. It will be readily understood that as the former 53 is being lifted by the lift cylinder 147, it also may be moved laterally relative to the mandrel 33 by the push cylinder units 164 and 166 as described more in detail hereinafter.

Figures 11, 12:
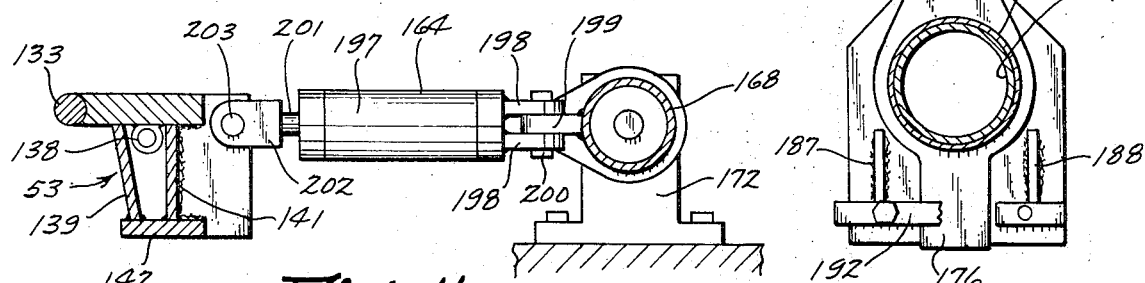
FIG. 11 is a vertical view taken along the line 11—11 in FIG. 10.
FIG. 12 is a vertical view taken along the line 12—12 in FIG. 10.
Figure 13:
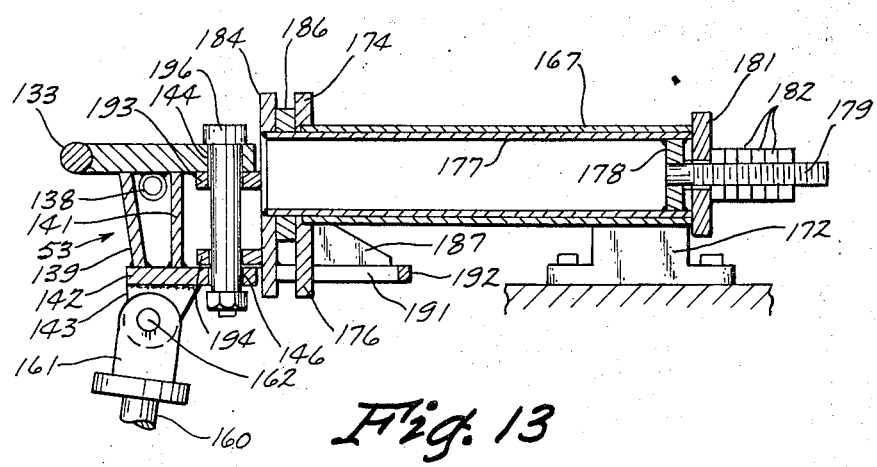
FIG. 13 is a vertical sectional view taken along the line 13—13 in FIG. 10.

The T-shaped connector device 163 comprises an outer tube 167 (FIGS. 10 and 13) having T-shaped ends 168 pivotally connected for rotation about a horizontal axis parallel to the longitudinal axis of the mandrel 33 by means of a pin 171 formed in each end 168. Each pin 171 is rotatably mounted in a mounting 172 (FIGS. 2 and 11) secured to the upper surface 173 of a frame member 59. At the forward or inner end of the tube 167 a flange 174 is secured which has a depending bar 176 (FIG. 12).

Rotatably mounted for both longitudinal and rotational movement within the outer tube 167 is an inner tube 177 (FIGS. 12 and 13), with a collar 178 being secured to the outer end of the inner tube 177 and having a threaded rod 179 inserted through a cover 181 for the outer tube 167. A plurality of washers 182 and a nut 183 (FIG. 10) may be placed on the exposed end of the rod 179 for adjusting the position of the inner tube 177 longitudinally within the outer tube 167. At the front of the inner tube 177 a plate 184 is secured having a spacer 186 also secured thereto for locating the front plate 184 relative to the flange 174 of the outer tube.

A pair of gussets 187 and 188 (FIG. 12) are secured to the front plate 184, having arms 189 and 191 secured to their bottom edge, and with the outer ends of the arms being connected by a bar 192, whereby the front plate 184 (FIG. 13) is rotatable with the inner tube 177 about a longitudinal axis extended normal to the longitudinal axis of the mandrel 33, said rotation being limited by either arm 189 or 191 striking the stationary depending bar 176 of the outer tube flange 174.

A pair of ears 193 and 194 (FIG. 13) are secured to the inner side of the front plate 184, and have holes provided therein which align with the holes 144 and 146 formed in the plate 132 and the base 142 therefor, such that a pin device 196 (FIGS. 10 and 13) can be secured therethrough. The pin 196 provides a pivotal connection about a vertical axis between the former plate 132 and the push unit 56 which enables the former 53 to rotate slightly about a vertical axis thereby enabling the former 53 to move in a horizontal plain slightly out of its normal parallel alignment with the longitudinal axis of the machine 20, and with the longitudinal axis of the mandrel 33.

Each hydraulic unit 164 and 166 (FIGS. 10 and 11) comprises a cylinder 197 having a pair of ears 198 at the rear therein for pivotal connection to a flange 199 formed on each T-end 168 by a pin 200. The piston rod 201 of each unit 164 and 166 has a yo 202 at the outer end thereof which is pivotally connected by a pin 203 to an ear 204 formed on the former plate 132. It will be noted that the rear pin 200 for each hydraulic unit is mounted in a vertical position such that the unit is swingable about a vertical axis, whereby the front pin 203 is mounted in a horizontal position disposed parallel to the longitudinal axis of the machine 20, such that the former unit 56 is movable about a horizontal axis disposed parallel to the mandrel 33 (FIG. 3).

Referring to FIGS. 2 and 14, a plurality of sheet edge flattening units 57 is shown spaced longitudinally of the center of the machine 20, and as each unit 57 is identical to the other units, only one will be described. A unit comprises a rectangular housing 206 shown in cross section in FIG. 2 and in side elevation in FIG. 14. The housing 206 includes a pair of laterally spaced upright walls 207 and 208 connected by a top 209 and a bottom 211. The piston rod 212 from a hydraulic cylinder 210 secured on a connector 68 of the frame has its lower end 213 secured to the top 209 of the housing 206 such that vertical movement of the piston 212 results in vertical movement of the housing 206. It will be noted that the exterior side surfaces of the walls 207 and 208 are guided by the roller units 66 and 67 on the vertical supports 64 of the machine frame.

An elongated base 214 (FIGS. 2 and 14) is secured to the bottom 211 of the housing 206 and has a wear plate 216 of like length secured thereto by a plurality of clips 217 held by fasteners 215.

At the rear of each housing 206 a pair of ears 218 are formed each with a hole 219, and at the front a pair of ears 221 are also formed with an elongated hole 222 therein such that the rear ears 218 of one housing 206 are pivotally connected to the front ears 221 of an adjacent housing 206 by a pair of pins 223. A space 224 (FIG. 14) is provided between each adjacent pair of longitudinally spaced housings 206 such that a certain amount of relative movement of the housings 206 is provided for flexibility of the machine 20.

In operation of the machine 20, the flat sheet 21 to be formed is pulled into the machine by the clamp unit 70 (FIG. 8) and chain 69 until located by the plurality of sheet locaters 49 (FIG. 3). By this arrangement, the smaller end 79 (FIG. 3) of the sheet is at the front end 41 (FIG. 1) of the machine and the larger end is at the rear end 42 of the machine, with the longitudinal axis of the sheet 21 directly over the longitudinal axis of the machine 20. The chain 69 is pulled between the sheet supporting plates 92 (FIG. 2). The outer edges 43 and 44 of the sheet 21 diverge from the front end 79 toward the rear end thereof equidistantly from the center line of the sheet 21, at any given cross sectional point along the longitudinal axis of the sheet 21.

The mandrel conveyor unit 32 then locates the mandrel 33 in the machine 20 and places it with the smaller front end 38 (FIG. 1) at the front of the machine such that the longitudinal axis of the mandrel 33 is directly over and axially aligned with the longitudinal axis of the sheet 21. To ensure this location of the mandrel, the locator cylinders 126 (FIG. 15) are activated to move the brackets 114 to their lowered positions shown in full lines in FIG. 15. The mandrel hold down fingers 112 (FIG. 2) are then forced downwardly by their cylinder units 108 against the mandrel 33 to maintain the mandrel against movement during the remainder of the sheet forming procedure. When the mandrel 33 is secure, the locator brackets 114 are raised to the dotted line position of FIG. 15 to be up and away from the sheet 21.

The vertical lift cylinders 147 (FIG. 2) are then activated to extend their pistons 160 (FIG. 4) where to force the front edge bars 133 upwardly against the outer edge portion of the sheet 21 directly thereabove. As the sheet 21 moves upwardly on both sides of the mandrel 33 by the combined simultaneously lifting action of the longitudinally aligned and spaced formers 53, the sheet 21 forms a U-shape as best illustrated in FIG. 4.

The horizontal push cylinders 164 and 166 (FIG. 10) are then activated such that their pistons 201 (FIGS. 4-6) force each former 53 inwardly toward the mandrel 33, pivoting the former plate 132 about its pivotal connection at 153 with the vertical lift cylinder 147 directly below. The inward projecting former bars 133 (FIGS. 5 and 6) thereby continue to form and wrap the sheet 21 about the mandrel 33 as they are pushed forwardly toward each other until the sheet assumes the condition of FIG. 5, with the edges 43 and 44 turned up. Subsequently, after the fingers 112 have been withdrawn, the overhead cylinders 210 (FIG. 2) are activated to lower the wear plates 216 downwardly against the free edges 43 and 44 (FIG. 6) to flatten them against the mandrel in a contiguous position.

Then the sheet edge flattening housings 206 are withdrawn, raising upwardly both the wear plates 216 and the finger 112, and the side formers 53 are also withdrawn to their initial positions, as illustrated in FIG. 2, leaving the mandrel 33 and the sheet 21, now an open tapered tube 27 (FIG. 6), free. The mandrel lift cylinders 36 are activated to lift the mandrel 33 whereby the tube 27 hangs loosely over the chain 69. Operation of the drive motor 73 (FIG. 1) causes a clamp unit 70' at the rear 42 of the machine to move over the chain support 94, and the unit 70' butts against the rear end of the tube 27, driving it out of the machine 20 and onto the discharge conveyor unit 28 for further processing. A pair of clamp units, or one clamp unit 70 and any block or the like (not shown) fastened to the chain 69, could be mounted one or two feet apart such that as the formed tube 27 is being pushed out of the machine 20, a new sheet 21 to be formed is being pulled in.

We claim:

1. A process of forming a hollow tapered tube from a thin metallic trapezoidal sheet comprising the following steps:
   supporting the sheet from below;
   positioning a tapered mandrel longitudinally of and above the sheet;
   pressing the mandrel down against the sheet by a first force from above;
   engaging the outer edges of the sheet from below and moving them upwardly and inwardly until the sheet is wrapped about said mandrel except for the still free outer edges;
   removing the first force from said mandrel while maintaining the mandrel stationary; and
   applying a second force from above to the free outer edges and completing the wrapping of the sheet about the mandrel.

2. The process of claim 1 and further wherein the second force embraces the first force and provides lateral support therefor.

3. The process of claim 1 and further wherein the outer edges of the sheet are moved upwardly by a pair of lower forces acting parallel to each other, and wherein the outer edges are then moved inwardly toward each other by a pair of side forces acting in converging relation to each other in substantially parallel planes.

4. A machine for forming a hollow tapered tube from a flat sheet of metal having a trapezoidal shape, comprising in combination:
   means for supporting in a normal horizontal condition the sheet, said supporting means engaging the sheet along its longitudinal axis;
   an elongated mandrel poised above the sheet, said mandrel having a progressively increasing cross sectional diameter from one end to the other end;
   means for placing said mandrel against the sheet and along its longitudinal axis;
   means for engaging each sheet adjacent its outer longitudinal edge portion and forming the sheet about the exterior surface of said mandrel whereby the outer edges of the sheet are positioned contiguous to each other;
   means for removing the formed sheet from the said mandrel; and
   means for holding said mandrel flat against the sheet which includes a plurality of vertically movable horizontally spaced finger elements retractably engageable with said mandrel.

5. A machine as described in claim 4, and wherein additional means movably embraces said finger elements and is operable to move vertically to engage the said outer edges of the sheet in their contiguous position and to force said edges flat against said mandrel.

6. A machine for forming a hollow tapered tube from a flat sheet of metal having a trapezoidal shape, comprising in combination;
   means for supporting in a normal horizontal condition the sheet, said supporting means engaging the sheet along its longitudinal axis;
   an elongated mandrel posied above the sheet, said mandrel having a progressively increasing cross sectional diameter from one end to the other end;
   means for placing said mandrel against the sheet and along its longitudinal axis;
   means for engaging each sheet adjacent its outer longitudinal edge portion and forming the sheet about the exterior surface of said mandrel whereby the outer edges of the sheet are positioned contiguous to each other; and
   means for removing the formed sheet from the said mandrel;
   and further wherein said engaging means includes a former element positioned normally below the sheet;
   first means pivotally connected to said former and operable to move said former upward and against the sheet, thereby forming the sheet about opposite sides of the mandrel; and
   second means pivotally connected to said former and operable to move said former inward toward said mandrel and against the sheet thereby forming the sheet about the upper side of the mandrel.

7. A machine as described in claim 6, and wherein said former element is pivotally movable about a normally vertical axis and about a normally horizontal axis.

8. A machine as described in claim 6 and wherein
   a pair of said former elements are positioned on opposite sides of the mandrel;
   a pair of said first means are positioned on opposite sides of the mandrel; and
   a pair of said second means are positioned on opposite sides of the mandrel.

* * * * *